(12) United States Patent
Gubbi Lakshminarasimha et al.

(10) Patent No.: US 12,346,951 B2
(45) Date of Patent: Jul. 1, 2025

(54) METHOD, SYSTEM, AND NON-TRANSITORY MACHINE-READABLE INFORMATION STORAGE MEDIUM FOR PERSONALIZED SUBSTITUTE PRODUCT RECOMMENDATION

(71) Applicant: Tata Consultancy Services Limited, Mumbai (IN)

(72) Inventors: Jayavardhana Rama Gubbi Lakshminarasimha, Bangalore (IN); Gaurab Bhattacharya, Bangalore (IN); Balamuralidhar Purushothaman, Bangalore (IN); Bagyalakshmi Vasudevan, Chennai (IN); Nikhil Kilari, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 291 days.

(21) Appl. No.: 17/970,666

(22) Filed: Oct. 21, 2022

(65) Prior Publication Data
US 2023/0162260 A1   May 25, 2023

(30) Foreign Application Priority Data

Nov. 19, 2021   (IN) .............................. 202121053364

(51) Int. Cl.
*G06Q 30/00*   (2023.01)
*G06F 16/56*   (2019.01)
*G06Q 30/0601*   (2023.01)

(52) U.S. Cl.
CPC ......... *G06Q 30/0631* (2013.01); *G06F 16/56* (2019.01); *G06Q 30/0621* (2013.01)

(58) Field of Classification Search
CPC . G06Q 30/0631; G06Q 30/0623–0629; G06Q 30/0601–0645; G06V 10/40;
(Continued)

(56) References Cited

U.S. PATENT DOCUMENTS 11,829,445 B1 * 11/2023 Bazzani ............ G06Q 30/0631
12,056,911 B1 *  8/2024 Shalev .................... G06F 18/22
(Continued)

OTHER PUBLICATIONS

Ho, Jonathan, et al. "Axial attention in multidimensional transformers." arXiv preprint arXiv:1912. 12180 (2019). (Year: 2019).*
(Continued)

*Primary Examiner* — Jeffrey A. Smith
*Assistant Examiner* — Kennedy Gibson-Wynn
(74) *Attorney, Agent, or Firm* — Finnegan, Henderson, Farabow, Garrett & Dunner, LLP

(57) ABSTRACT

Product recommendation is a very important aspect of e-commerce applications. Traditional product recommendation systems recommend products similar to a query image provided by a user and allows minimum or no personalization. It is challenging to incorporate personalization due to the presence of overlapping fine-grained attributes, variations in attribute style and visual appearance, small inter-class variation and class imbalance in the images of products. Embodiments of present disclosure address these challenges by a method of personalized substitute product recommendation using Personalized Attribute Search Networks (PAtSNets) comprising neural network layers interleaved with Attentive Style Embedding (ASE) modules to generate attribute-aware feature representation vector of a query image provided by the user and conforming to the personalization instructions specified by the user. This feature representation vector is then used to recommend substitute products to the user. Thus, embodiments of present disclosure enable accurate substitute product recommendation suiting user requirements.

14 Claims, 10 Drawing Sheets

(58) Field of Classification Search
CPC ............ G06V 10/945; G06F 16/24578; G06F 16/532; G06F 16/55; G06F 16/56; G06F 16/9535; G06F 18/22
See application file for complete search history.

(56) References Cited

U.S. PATENT DOCUMENTS

| | | | |
|---|---|---|---|
| 2021/0073890 A1* | 3/2021 | Lee ..................... | G06N 20/20 |
| 2022/0083806 A1* | 3/2022 | Cho .................... | G06Q 30/0643 |
| 2023/0061998 A1* | 3/2023 | Yang .................... | G06N 3/08 |
| 2023/0081171 A1* | 3/2023 | Zhang ................... | G06V 10/82 |
| | | | 382/157 |
| 2023/0385903 A1* | 11/2023 | Lindgren ............ | G06F 16/9535 |

OTHER PUBLICATIONS

Yan, Xiangyi et al., "AFTer-UNet: Axial Fusion Transformer UNet for Medical Image Segmentation." 2022 IEEE/CVF Winter Conference on Applications of Computer Vision (WACV) (2021): 3270-3280. (Year: 2021).*

Hou et al., "Explainable Fashion Recommendation: A Semantic Attribute Region Guided Approach," (2019).

Sha et al., "An Approach for Clothing Recommendation Based on Multiple Image Attributes," (2016).

* cited by examiner

Input query image     Output image 1     Output image 2

METHOD, SYSTEM, AND NON-TRANSITORY MACHINE-READABLE INFORMATION STORAGE MEDIUM FOR PERSONALIZED SUBSTITUTE PRODUCT RECOMMENDATION

PRIORITY CLAIM

This U.S. patent application claims priority under 35 U.S.C. § 119 to: Indian Patent Application No. 202121053364, filed on Nov. 19, 2021. The entire contents of the aforementioned application are incorporated herein by reference.

TECHNICAL FIELD

The disclosure herein generally relates to the field of product recommendation, and, more particularly, to method and system for personalized substitute product recommendation.

BACKGROUND

In retail applications, machine learning-based solutions have brought revolution in customer satisfaction by providing personalized experience. Understanding the fine-grained retail fashion attributes is necessary to demonstrate efficient substitute or similar product recommendation systems. In traditional substitute recommendation systems, similar products decided using stored meta-information are shown to the customer. For example, if a shirt is given as a query, the recommendation engine works on selecting shirt images having similar meta-tags as that in the query, hence the recommendation operation becomes easy. However, in realistic scenarios, there is a need to personalize the suggestions based on inputs from the customer to provide a better customer experience. In this process, it is important to capture the visual properties that can lead to better recommendation. This requires attribute-aware substitution recommendation which is more complex because the recommendation system has to understand the underlying fine-grained visual attributes of the product and recommend products from the same class (shirt in our example) having attributes desired by the customer. Thus, the product search has to be adjusted depending upon customer's input. For example, a shirt is shown to a customer who didn't like some of its features (i.e., attributes) and wants to get the recommendation of similar product (i.e., shirt) with his personal choice of features (i.e., attributes). However, this personalized substitute product recommendation has multiple challenges. Firstly, in order to provide attribute-aware recommendation, attribute-aware representation of the query image needs to be extracted which is a difficult job given the overlapping fine-grained nature of attributes. Secondly, the product has to be represented as an aggregation of attribute representations which is an open research area. Furthermore, different values of same attribute may capture strong visual similarity, whereas same values of attributes can possess visually dissimilar examples, resulting in large intra-class and relatively small inter-class variations.

SUMMARY

Embodiments of the present disclosure present technological improvements as solutions to one or more of the above-mentioned technical problems recognized by the inventors in conventional systems. For example, in one embodiment, a processor implemented method for personalized substitute product recommendation is provided. The method includes receiving a query image of a product and optionally one or more personalization instructions comprising one or more attributes of the product and values corresponding to the one or more attributes. Further a plurality of feature vectors of the query image are generated using a plurality of Personalized Attribute Search Networks (PAtSNets). Each of the plurality of PAtSNets generate one feature vector corresponding to an attribute of the query image. Further, the method includes concatenating the plurality of feature vectors into a feature representation vector, wherein the feature vectors corresponding to the one or more attributes in the one or more personalization instructions, if present, are replaced by generic vectors corresponding to the one or more attributes in the one or more personalization instructions before concatenation. Furthermore, the method includes recommending one or more images of the product from a database of images based on distance between the feature representation vector and vectors of each image in the database of images.

In another aspect, a system for personalized substitute product recommendation is provided. The system comprises: a memory storing instructions; one or more communication interfaces; and one or more hardware processors coupled to the memory via the one or more communication interfaces, wherein the one or more hardware processors are configured by the instructions to: receive a query image of a product and optionally one or more personalization instructions comprising one or more attributes of the product and values corresponding to the one or more attributes. Further, a plurality of feature vectors of the query image are generated using a plurality of Personalized Attribute Search Networks (PAtSNets). Each of the plurality of PAtSNets generate one feature vector corresponding to an attribute of the query image. Further, the one or more hardware processors are configured to concatenate the plurality of feature vectors into a feature representation vector, wherein the feature vectors corresponding to the one or more attributes in the one or more personalization instructions, if present, are replaced by generic vectors before concatenation. Furthermore, the one or more hardware processors are configured to recommend one or more images of the product from a database of images based on distance between the feature representation vector and vectors of each image in the database of images.

In yet another aspect, there are provided one or more non-transitory machine-readable information storage mediums comprising one or more instructions which when executed by one or more hardware processors cause a method for personalized substitute product recommendation. The method comprising receiving a query image of a product and optionally one or more personalization instructions comprising one or more attributes of the product and values corresponding to the one or more attributes. Further, a plurality of feature vectors of the query image are generated using a plurality of Personalized Attribute Search Networks (PAtSNets). Each of the plurality of PAtSNets generate one feature vector corresponding to an attribute of the query image. Further, the method includes concatenating the plurality of feature vectors into a feature representation vector, wherein the feature vectors corresponding to the one or more attributes in the one or more personalization instructions, if present, are replaced by generic vectors before concatenation. Furthermore, the method includes recommending one or more images of the product from a database of images based on distance between the feature representation vector and vectors of each image in the database of images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
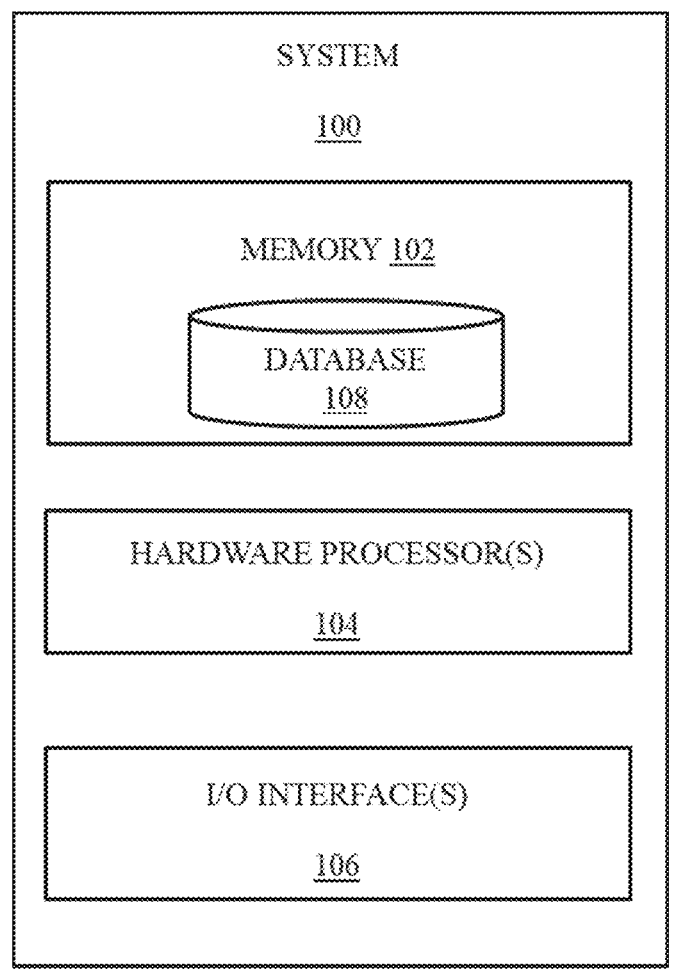
FIG. 1 illustrates an exemplary system for personalized substitute product recommendation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure present technological improvements as solutions to one or more of the above-mentioned technical problems recognized by the inventors in conventional systems. For example, in one embodiment a processor implemented method for personalized substitute product recommendation is provided. In this method, a query image and optionally one or more personalization instructions comprising one or more attributes of the product and values corresponding to the one or more attributes are received as input from a user (alternatively referred as customer). Further, a plurality of feature vectors of the query image are generated using a plurality of Personalized Attribute Search Networks (PAtSNets). Each of the plurality of PAtSNets generate one feature vector corresponding to an attribute of the query image. Further, the method includes concatenating the plurality of feature vectors into a feature representation vector, wherein the feature vectors corresponding to the one or more attributes in the one or more personalization instructions, if present, are replaced by generic vectors before concatenation. Furthermore, the method includes recommending one or more images of the product from a database of images based on distance between the feature representation vector and vectors of each image in the database of images. In an embodiment, the one or more personalization instructions of specify user requirements with respect to the one or more attributes of the product in the query image. In an embodiment, each of the plurality of PAtSNets comprises a plurality of neural network layers interleaved with a plurality of Attentive Style Embedding (ASE) modules, wherein each of the plurality of ASE modules include a multi-scale feature extraction sub-network, and a concurrent axial attention sub-network.

The technical challenges observed in conventional systems including the presence of overlapping fine-grained attributes, variations in attribute style and visual appearance, small inter-class variation and class imbalance are addressed by the ASE module and the PAtSNet. The ASE module extracts multi-scale fine-grained features using the multi-scale feature extraction sub-network to tackle visually similar attributes with low inter-class variance. Similarly, the concurrent axial attention sub-network in the ASE module separately investigates discriminatory cues across three axes (height, width, and channel) to resolve issues due to overlapping attributes and style, visual appearance variations. The proposed PAtSNet architecture comprising neural network layers interleaved with ASE modules generates attribute-aware style embedding without involving any other complex sub-units, such as memory block, Region of Interest (RoI) extraction, etc. Thus, the present disclosure successfully incorporates the desired attribute information specified by the customers (by personalization instruction) to provide a personalized flexible product recommendation and outperforms other state-of-the-art methodologies by a significant margin.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary system for personalized substitute product recommendation, according to some embodiments of the present disclosure. In an embodiment, the system 100 includes a processor(s) 104, communication interface device(s), alternatively referred as Input/Output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to receive inputs from the user and to display the recommended one or more images of the product and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with substitute product recommendation being performed by the system 100. For example, the database 108 stores the configurable instructions that are executed to cause the one or more hardware processors 104 to perform various steps associated with the substitute product recommendation. The database 108 may further store information including, but are not limited to, information associated with at least one of: (i) query image, (ii) ground truths, (iii) images of products, (iv) generic vectors of attributes of the products, (v) PAtSNets corresponding to attributes of products and so on. Further, the database 108 stores information pertaining to inputs fed to the system 100 and/or outputs generated by the system (e.g., at each stage), specific to the methodology described herein. Functions of the components of the system 100 are explained in conjunction with the flow diagrams in FIG. 2 through FIG. 4, block diagrams of FIG. 5 and FIG. 6 and example illustrated in FIG. 8.

Figure 2:
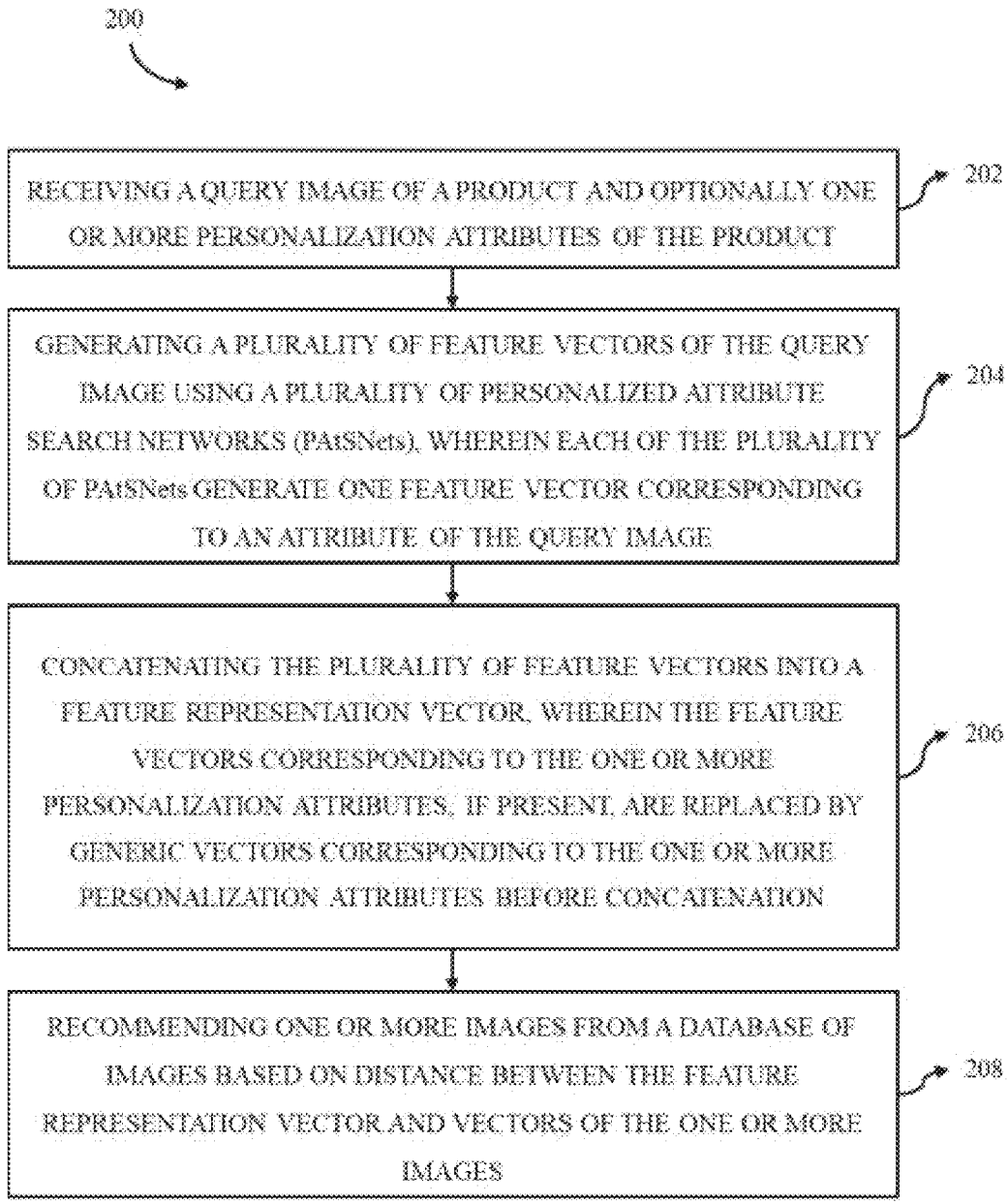
FIG. 2 is a flowchart illustrating a method for personalized substitute product recommendation, using the system of FIG. 1, according to some embodiments of the present disclosure.

FIG. 2 is a flowchart illustrating a method (200) for personalized substitute product recommendation, using the system of FIG. 1, according to some embodiments of the present disclosure. At step 202 of the method 200, the one or more hardware processors 104 are configured to receive a query image of a product and optionally one or more personalization instructions comprising one or more attributes of the product and values corresponding to the one or more attributes. In an embodiment, the one or more personalization instructions specify user requirements with respect to the one or more attributes of the product in the query image. As an example, consider FIG. 8 which depicts input query image of a half sleeve shirt. The personalization instruction specified by the user is sleeve attribute with value full. In other words, the personalization instruction specifies that the user requires shirt having full sleeve. The method 200 recommends full sleeve shirts (output image 1 and output image 2) with other attributes similar to the query image. In an embodiment, a ground truth corresponding to the value(s) of attribute(s) in the personalization instruction is identified for further processing by the method 200. The ground truth is a numerical value for a value of an attribute of the product and is pre-defined by an expert. In an embodiment, the ground truths of all possible values of the attributes of the product are stored in the database 108 and are retrieved during execution of the method 200. Consider the example illustrated in the block diagram of FIG. 5 wherein personalization instructions specified by the user are attribute 2 and attribute 5 having values x and y whose ground truths are 10 and 20 respectively. For the shirt example illustrated in FIG. 8, the ground truth corresponding to full sleeve is retrieved from the database 108.

At step 204 of the method 200, the one or more hardware processors 104 are configured to generate a plurality of feature vectors of the query image using a plurality of Personalized Attribute Search Networks (PAtSNets). Each of the plurality of PAtSNets generate one feature vector corresponding to an attribute of the query image. Using separate PAtSNet for each attribute of the product is a crucial step for personalized substitute recommendation because it helps in extracting fine-grained attribute information for the query image. In an embodiment, each of the plurality of PAtSNets comprises a plurality of neural network layers interleaved with a plurality of Attentive Style Embedding (ASE) modules. Each of the plurality of ASE modules include a multi-scale feature extraction sub-network, and a concurrent axial attention sub-network. Working of the multi-scale feature extraction sub-network and the concurrent axial attention sub-network will now be explained with reference to the flowcharts illustrated in FIG. 3 and FIG. 4 and block diagram of FIG. 6.

In an embodiment, table 1 lists the neural network layers and position of ASE modules in each of the plurality of PAtSNets along with size or dimensions of input and output of each layer. In an embodiment, in the dense layer after global average pooling, dropout of 0.25 is used. As understood by a person skilled in the art, dropout is a process carried out during training of a neural network to prevent the neural network from overfitting the training data and enable the neural network to generalize well to new data encountered during inference. Thus, performing dropout enables PAtSNet to generate feature vector of the query image more accurately.

TABLE 1

| Input Size | Output Size | Layer Name |
| --- | --- | --- |
| (256, 256, 3) | (256, 256, 32) | Conv (32, (3, 3), 2) |
| (256, 256, 32) | (128, 128, 32) | Max Pool (2, 2) |
| (128, 128, 32) | (128, 128, 64) | ASE Module-1 |
| (128, 128, 64) | (64, 64, 64) | Max Pool (2, 2) |
| (64, 64, 64) | (64, 64, 128) | ASE Module-2 |
| (64, 64, 128) | (32, 32, 128) | Max Pool (2, 2) |
| (32, 32, 128) | (32, 32, 256) | ASE Module-3 |
| (32, 32, 256) | (256) | Global Avg. Pool. |
| (256) | (256) | Dense (256) |
| (256) | (128) | Dense (128) |

In an embodiment, each of the plurality of PAtSNets is trained to generate feature vectors using triplet loss which takes anchor (A), positive (P) and negative (N) image instances to generate the loss according to equation 1. The A, P, N triplets are generated from an image dataset such as DeepFashion and Shopping100k. For example, for the PAtSNet to be trained for colour category a training triplet can include one blue coloured T-shirt as anchor, one blue trouser as positive and one red T-shirt as negative. This is done to ensure that the PAtSNet learns the features pertaining to the colour attribute, not the features of the shirt as a whole.

$$L_{triplet}(A,P,N)=\max[0,\text{dist}(f_A,f_P)-\text{dist}(f_A,f_N)+\mu] \quad (1)$$

In equation 1, $f_X$ represents 128-dimensional feature vector of image X (i.e., $f_A$, $f_P$, and $f_N$ represents feature vector of anchor, positive and negative image instance respectively), extracted from PAtSNet and µ is the margin. In an embodiment, $L_2$ distance is considered as distance metric for training the PAtSNet.

Figure 5:
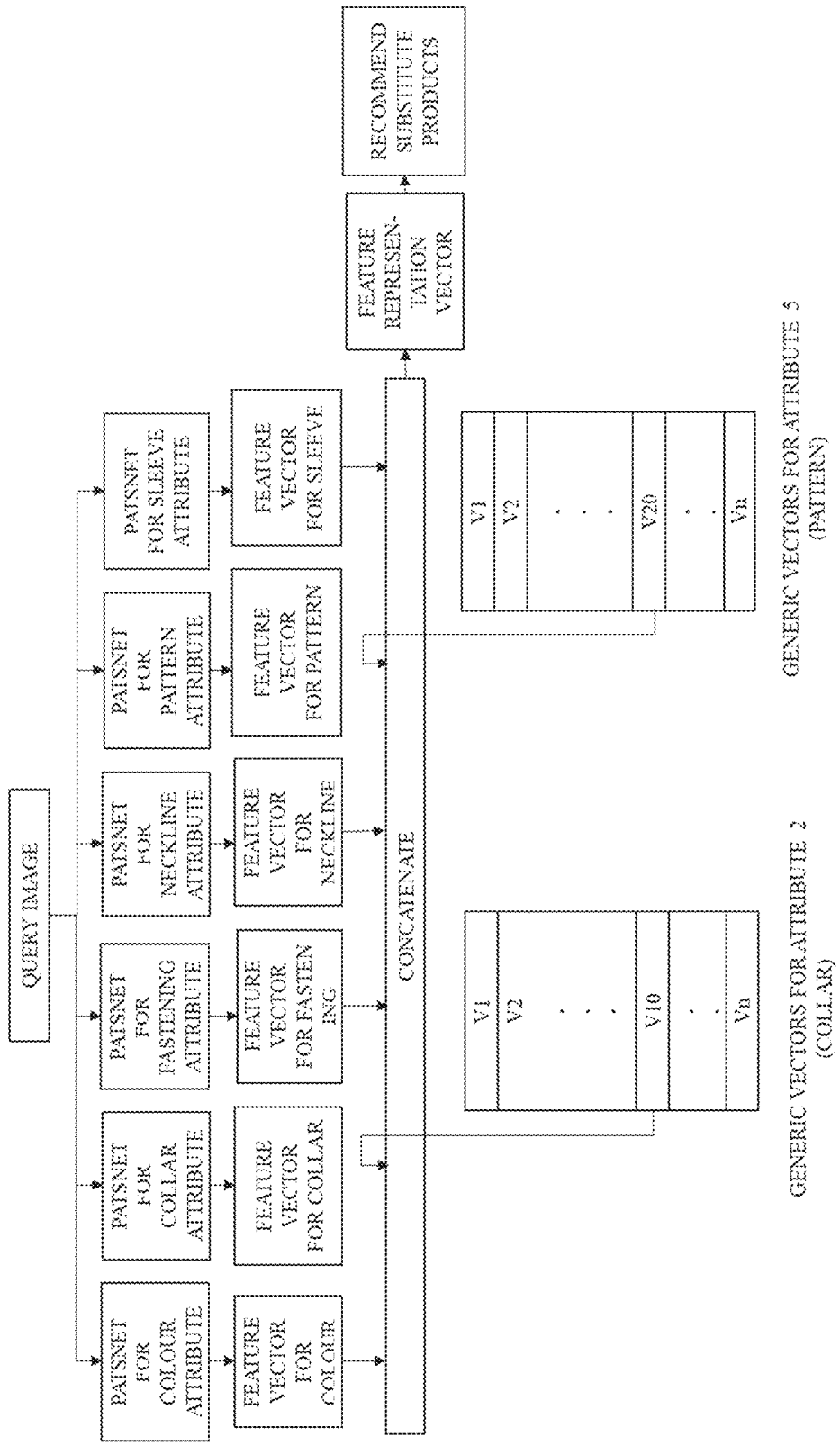
FIG. 5 is a block diagram illustrating an example implementation of the method illustrated in FIG. 2, using the system of FIG. 1, according to some embodiments of the present disclosure.

In an embodiment, attributes of a product include colour, collar, fastening, neckline, pattern, and sleeve. Considering a different set of attributes of the product is well within the scope of present disclosure. As illustrated in FIG. 5, each of the plurality of PAtSNets generate one feature vector corresponding to an attribute of the product. For example, PAtSNet trained on images of colour attribute generates a feature vector corresponding to colour attribute of the query image. In an embodiment, size or dimension of the feature vector generated by PAtSNet is 128. As understood by a person skilled in the art, a different size of the feature vector can be considered as per requirement.

Returning to the method 200, at step 206, the one or more hardware processors 104 are configured to concatenate the plurality of feature vectors into a feature representation vector, wherein the feature vectors corresponding to the one or more attributes in the one or more personalization instructions, if present, are replaced by generic vectors corresponding to the one or more attributes in the one or more personalization instructions before concatenation. For example, consider block diagram of FIG. 5 wherein the personalization instructions specified by the user include attribute 2 and 5 having values x and y respectively. Hence, the feature vectors generated by PAtSNet corresponding to attributes 2 and 5 are replaced by generic vectors corresponding to the ground truths of the values x and y before concatenating feature vectors of the query image. In an embodiment, the generic vectors represent a particular value of an attribute. For example, consider attribute 5 representing pattern attribute of the query image (in FIG. 5). Suppose pattern in the query image of a shirt is stipes but the user requirement (specified by personalization instruction) is checks, then, feature vector generated by PAtSNet corresponding to stipes is replaced by generic vector corresponding to checks before concatenating all the feature vectors of the query image.

In an embodiment, the generic vectors can be computed by collecting a plurality of images of the product comprising the desired attribute having desired ground truth, obtaining feature vectors of each of the plurality of images using PAtSNet corresponding to the desired attribute, and averaging the obtained feature vectors to obtain the generic vector representing the desired attribute having desired ground truth. The computed generic vectors corresponding to all possible ground truth values of all the attributes of one or more products are stored in the database 108 and are used in the step 206 for generating feature representation vector. As understood by a person skilled in the art, different ways of computing generic vectors may be used in other embodiments. Suppose the user doesn't specify any personalization instruction(s), then, the step 206 concatenates the feature vectors generated by the plurality of PAtSNets without any modification to obtain the feature representation vector.

Further, at step 208 of the method 200, the one or more hardware processors 104 are configured to recommend one or more images of the product from a database of images (alternatively referred as retrieval gallery) of the product based on a measured/calculated distance between the feature representation vector and vectors of each image in the retrieval gallery. In an embodiment, $L_2$ distance between the feature representation vector and vectors of each image in the retrieval gallery is computed. Value of the $L_2$ distance is proportional to similarity between the feature representation vector and vector of an image in the retrieval gallery the feature representation vector is being compared with i.e., higher the dissimilarities between the feature representation vector and vector of the image in the retrieval gallery, higher is the value of the $L_2$ distance. Similarly, value of the $L_2$ distance is comparatively less if the feature representation vector and vector of the image in the retrieval gallery are similar to each other. The system 100 may sort the images in the retrieval gallery based on the value of the $L_2$ distance, and top-k images having smallest value of the $L_2$ distance (i.e., having least distance from the query image in terms of similarities) are selected from the retrieval gallery and are displayed to the user via the I/O interface 106.

Figure 3:
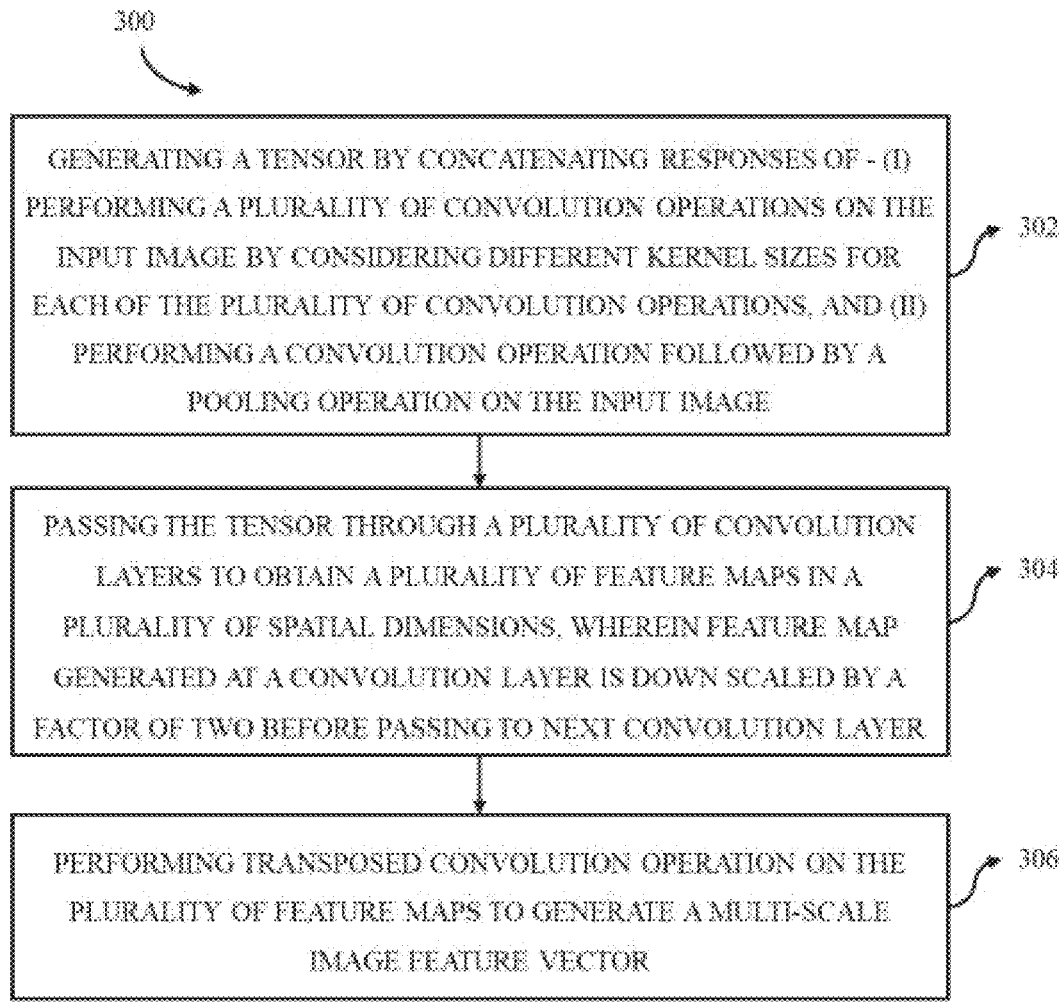
FIG. 3 is a flowchart for a process of extracting fine-grained attribute features of an input image across multiple scales by the multi-scale feature extraction subnetwork of the system of FIG. 1, according to some embodiments of present disclosure.
Figure 6A:
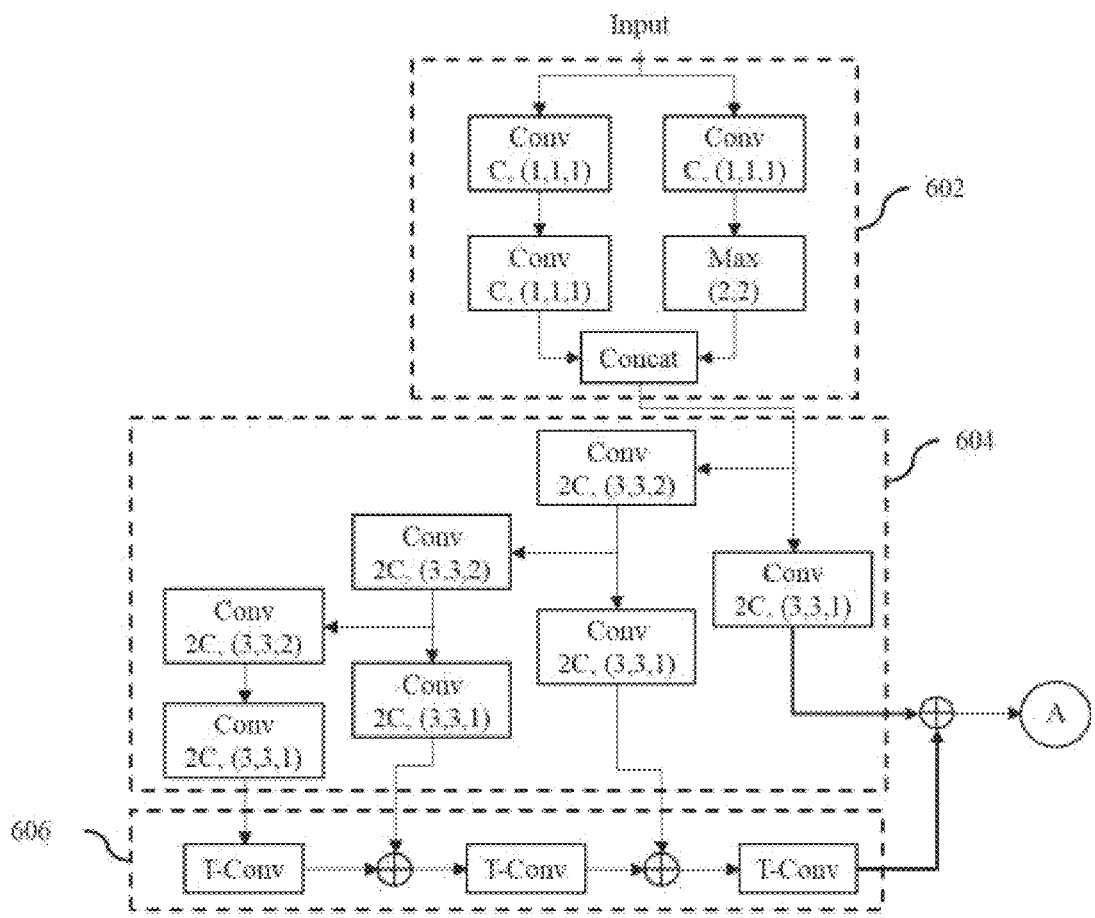
FIG. 6A and FIG. 6B, collectively referred to as FIG. 6, depict architecture of an Attentive Style Embedding (ASE) block comprising multi-scale feature extraction subnetwork and concurrent axial attention subnetwork, according to some embodiments of the present disclosure.
Figure 6B:
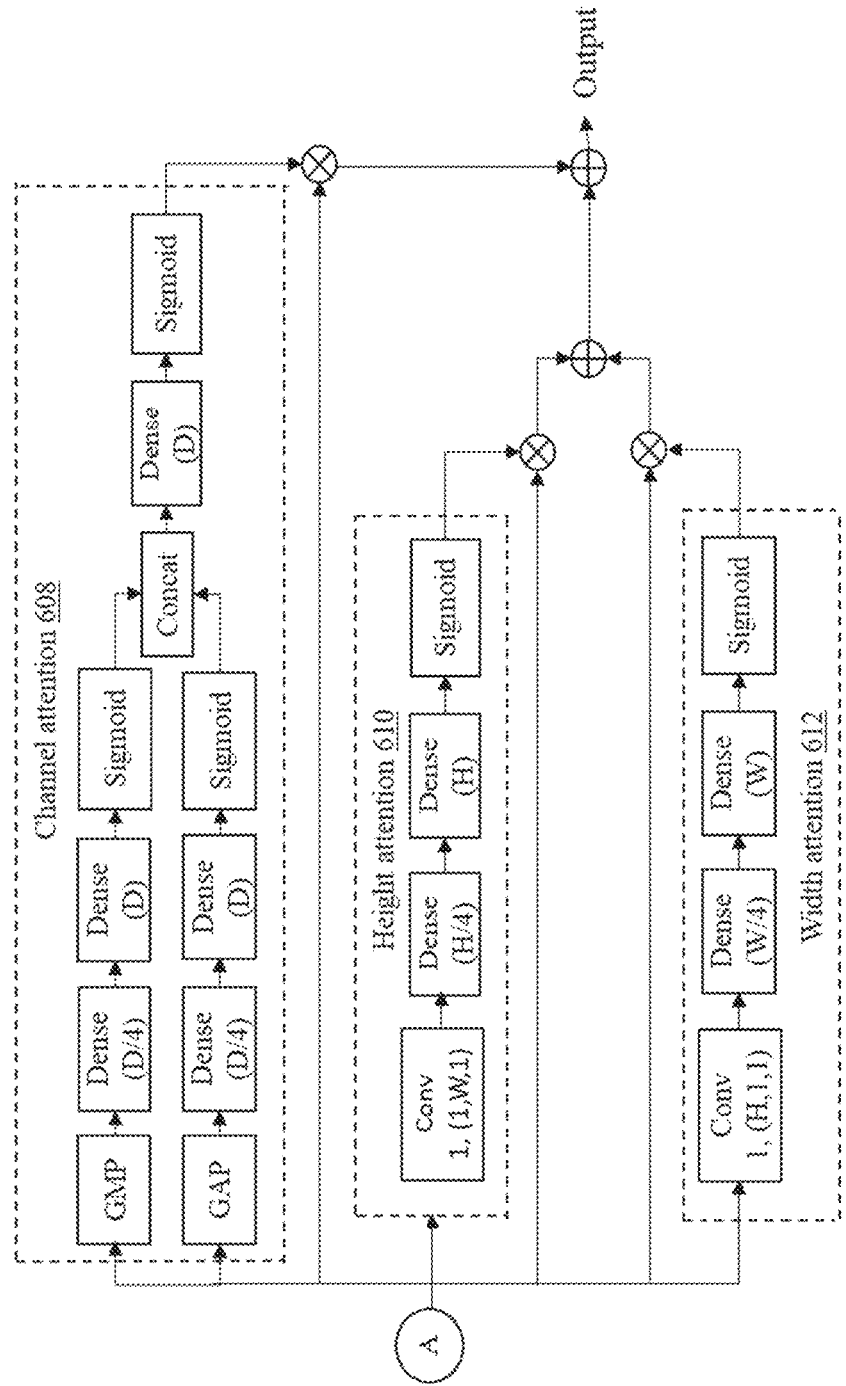
Figure 7A:
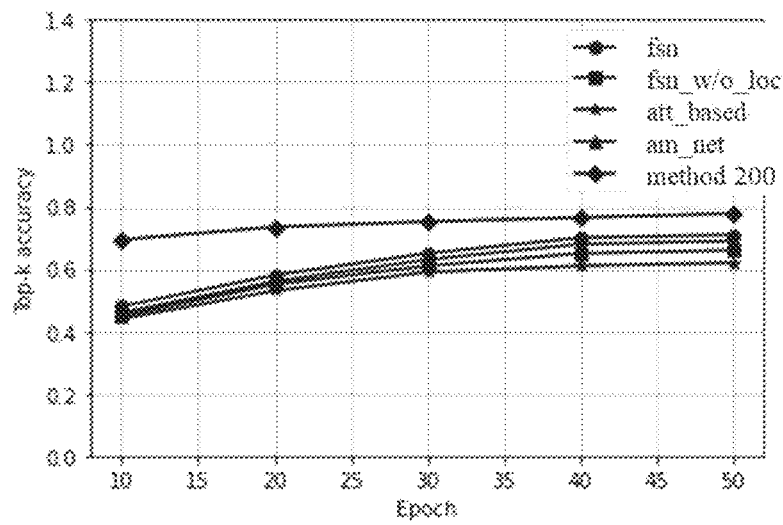
FIG. 7A through FIG. 7D, collectively referred to as FIG. 7, depicts a graphical representation illustrating comparison of (i) top-k accuracy of a plurality of substitute product recommendation methods and (ii) top-k accuracy of method of present disclosure, according to some embodiments of the present disclosure.
Figure 7B:
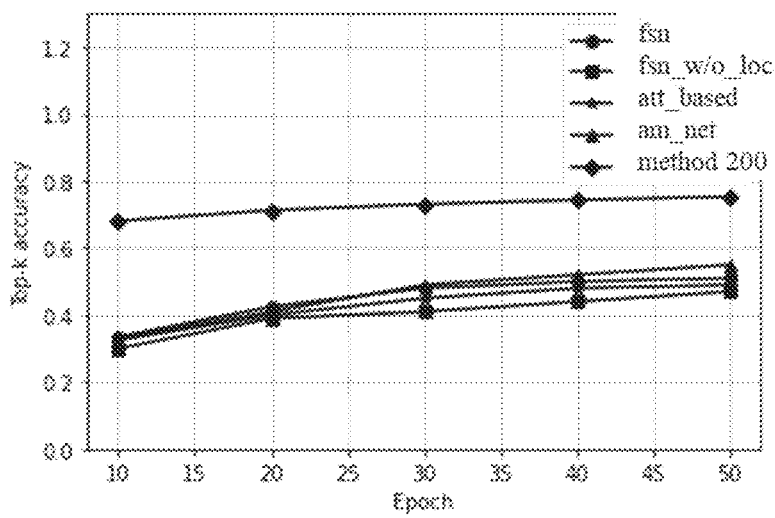
Figure 7C:
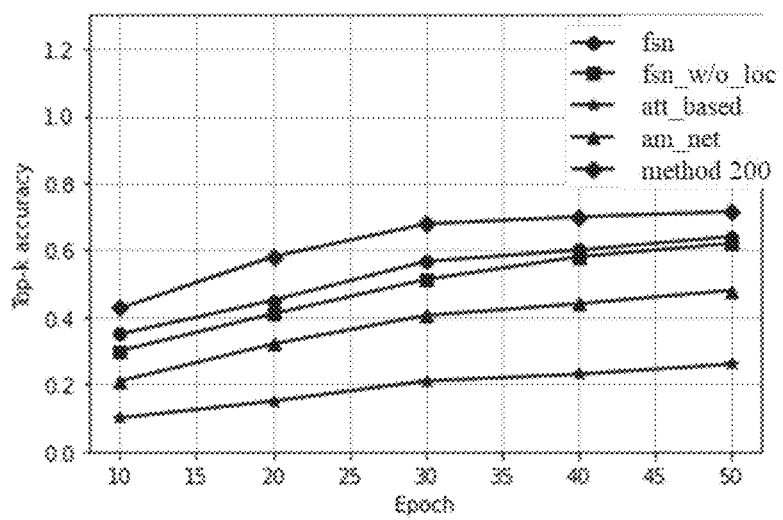
Figure 7D:
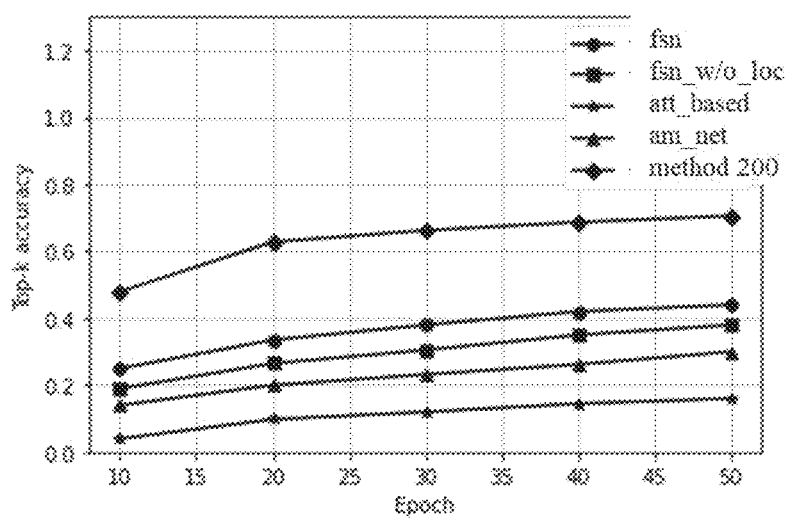
Figure 8:
FIG. 8 illustrates input and outputs of method illustrated in FIG. 2 in an example implementation of the system of FIG. 1, according to some embodiments of present disclosure.
Figure 8:
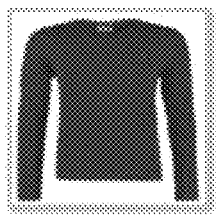
Figure 8:
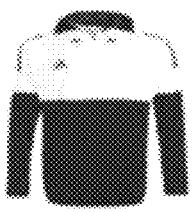
Figure 8:
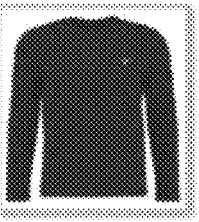

FIG. 3 is a flowchart for a process of extracting fine-grained attribute features of an input image across multiple scales by the multi-scale feature extraction subnetwork of the system of FIG. 1, according to some embodiments of present disclosure. FIG. 3 is explained in conjunction with block diagram of FIG. 6A. The multi-scale feature extraction sub-network illustrated in FIG. 6A generates a holistic representation of attributes by the process 300 which enables the PAtSNet to obtain crucial features for better discrimination in style space. The fine-grained features generated by the multi-scale feature extraction subnetwork across multiple scales alleviate the inter-class similarity problem encountered in state-of-the-art personalized substitute product recommendation techniques. In FIG. 6, Conv X, (Y, Z, S) represents a convolution layer with kernel size of (Y, Z) and stride as S and filter$_{num}$ as X. Similarly, Max(A, B) represents max pooling layer with pool size of (A, A) and stride as B. At step 302 of process 300, a tensor is generated by concatenating responses of—(i) performing a plurality of convolution operations on the input image by considering different kernel sizes for each of the plurality of convolution operations, and (ii) performing a convolution operation followed by a pooling operation on the input image. In an embodiment, the step 302 is achieved by block 602 in FIG. 6A. Further, at step 304 of the process 300, the tensor is passed through a plurality of convolution layers to obtain a plurality of feature maps in a plurality of spatial dimensions, wherein feature map generated at a convolution layer is down scaled by a factor of two before passing to next convolution layer as illustrated in block 604 of FIG. 6A. The block 604 is mathematically represented by equation 2.

$$C_i = \text{Conv}(T_i), \text{ where } T_i = \text{Conv}(T_{i-1}), \forall i \in \{2,3,4\} \quad (2)$$

Further, at step 306 of the process 300, transposed convolution operation is performed on the plurality of feature maps to generate a multi-scale image feature vector (depicted as A in FIG. 6). The step 306 overlays the information extracted across multiple feature maps for obtaining the holistic information regarding fine-grained attributes. In an embodiment, the step 306 is performed by block 606 of FIG. 6A and is mathematically represented by equation 3.

$$\text{Out} = C_1, \text{ where } C_i = C_i + T\text{Conv}(C_{i+1}), \forall i \in \{3,2,1\} \quad (3)$$

In equation 3, Out represents the multi-scale image feature vector, TConv represents transposed convolution operation with kernel size=(3,3), stride=2 and number of channels is same as Conv layers considered in the step 304.

Figure 4:
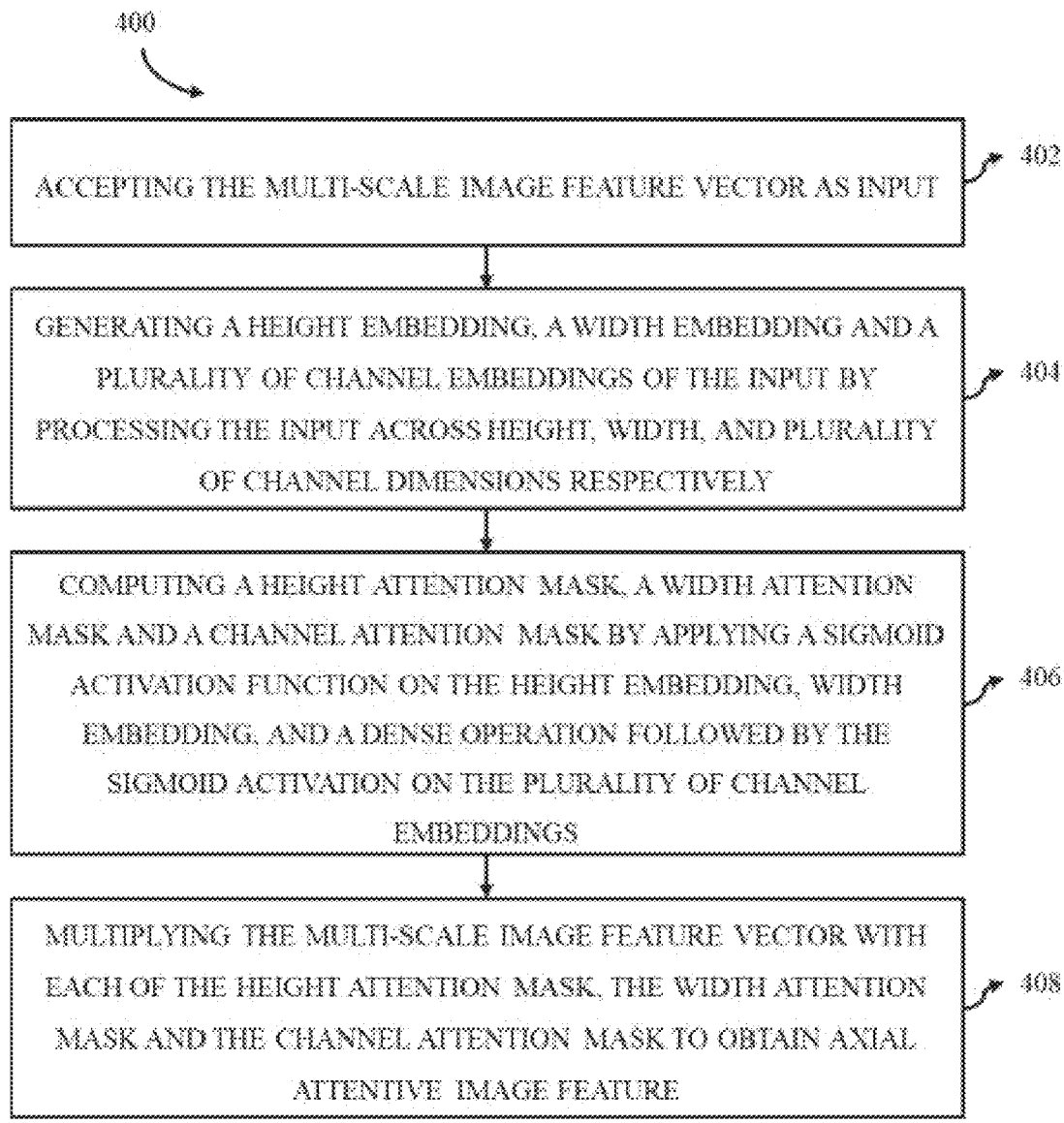
FIG. 4 is a flowchart for a process of generating feature representation of the input image by the concurrent axial attention subnetwork of the system of FIG. 1, according to some embodiments of present disclosure.

FIG. 4 is a flowchart for a process (400) of generating feature representation of the input image by the concurrent axial attention subnetwork of the system of FIG. 1, according to some embodiments of present disclosure. FIG. 4 is explained in conjunction with block diagram of FIG. 6B. The concurrent axial attention subnetwork separately investigates all three axes (height, width, and channel) to obtain more expressible features and diminishes redundant regions. At step 402 of the process 400, the multi-scale image feature vector generated by the multi-scale feature extraction subnetwork is accepted as input by the concurrent axial attention subnetwork. In an embodiment, the input is mathematically represented as X(H, W, C) wherein H, W, and C represent height, width, and number of channels respectively. In an embodiment, steps 404 and 406 are performed by blocks 608, 610 and 612 illustrated in FIG. 6B. At the step 404 of the process 400, a height embedding, a width embedding, and a plurality of channel embeddings of the input are generated by processing the input across height, width, and plurality of channel dimensions respectively. Further, at step 406 of the process 400, a height attention mask, a width attention mask and a channel attention mask are computed by applying a sigmoid activation function on the height embedding, width embedding, and a dense operation followed by the sigmoid activation on the plurality of channel embeddings.

The block 608 processes the input to generate a plurality of channel embeddings and a channel attention mask by first embedding global information for every channel using Global Average Pooling (GAP) and Global Max Pooling (GMP) to generate embedding vectors. Then, the embedding vectors are processed by subsequent dense layers to enclose complex variations in the features. The sigmoid layers then create the corresponding mask vectors from these embedding vectors, as given in equations 4a and 4b. These two mask vectors are then concatenated to give the combined response of average and maximum values of each spatial plane in the feature map. The concatenated feature map contains aggregation of responses trained using different set of parameters. Hence, to obtain the global representative for each channel, another dense layer followed by a sigmoid activation is used for generating channel attention mask. The discriminatory regions of the input are then highlighted by multiplying the channel attention mask (Men) with the multi-scale image feature vector in step 408. This operation can be mathematically represented by equation 4c wherein I represents multi-scale image feature vector.

$$x_1=\sigma(\text{Dense}(\text{Dense}(\text{GMP}(X),C/4),C)) \quad (4a)$$

$$x_2=\sigma(\text{Dense}(\text{Dense}(\text{GAP}(X),C/4),C)) \quad (4b)$$

$$M_{ch}=I\times\sigma(\text{Dense}(\text{Concat}(x_1,x_2),C)) \quad (4c)$$

The blocks 610 and 612 processes the input along height and width dimensions respectively to generate height embedding, height attention mask ($M_h$), width embedding and width attention mask ($M_w$). To generate height embedding and width embedding, convolution operation is performed using kernel of size (1, W) and (H, 1) respectively followed by two dense operations. Further, the height attention mask and the width attention mask are generated using a sigmoid activation function to softly weigh the relative locations in the input for better discrimination (represented by equations 5a and 5b).

$$M_h=\sigma(\text{Dense}(\text{Dense}(\text{Conv}(X),H/4),H)) \quad (5a)$$

$$M_w=\sigma(\text{Dense}(\text{Dense}(\text{Conv}(X),W/4),W)) \quad (5b)$$

At step 408 of the process 400, the multi-scale image feature vector is multiplied with each of the height attention mask, the width attention mask, and the channel attention mask (represented by equation 4c) and the resultant products are summed up to obtain axial attentive image feature which is given as output of the concurrent axial attention subnetwork.

Results and Analysis

Experimental Setup

Database: To evaluate the performance of the present disclosure, a series of experiments are conducted on DeepFashion [Ziwei Liu et al. DeepFashion: Powering robust clothes recognition and retrieval with rich annotations. In Proceedings of IEEE Conference on Computer Vision and Pattern Recognition (CVPR), pages 1096-1104, 2016] and Shopping100K [Kenan E Ak et al. Efficient multi-attribute similarity learning towards attribute-based fashion search. In Proceedings of the IEEE Winter Conference on Applications of Computer Vision (WACV), pages 1671-1679, 2018] database. The DeepFashion database provides product images consisting of six attributes, namely texture, sleeve, length, neckline, category, and shape. From the Shopping100k database six attribute categories are considered (namely colour, collar, fastening, neckline, pattern, and sleeve) among 12 attributes. For training the PAtSNet, 90000 triplets are generated for each attribute for both databases by sampling same number of positive and negative instance for each anchor image. For the quantitative evaluation, personalization instructions are generated for each query image to facilitate substitute product recommendation for both single and multiple attributes in personalization instructions.

Baselines: The method of present disclosure is compared with state-of-the-art methodologies including (1): An attribute recognition method with AlexNet [Alex Krizhevsky et al. Imagenet classification with deep convolutional neural networks. In Advances in neural information processing systems (NIPS), pages 1097-1105, 2012] backbone, which replaces the unwanted attributes from the query images with the attributes in personalization instructions after prediction, (2): AMNet architecture [Bo Zhao et al. Memory-augmented attribute manipulation networks for interactive fashion search. In Proceedings of the IEEE Conference on Computer Vision and Pattern Recognition (CVPR), pages 1520-1528, 2017], (3). FashionSearchNet (FSNet) [Kenan E Ak et al. Fashionsearchnet: Fashion search with attribute manipulation. In Proceedings of the European Conference on Computer Vision Workshops (ECCVW), pages 45-53, 2018.] and (4). FashionSearchNet without localization (FSNet w/o Loc) by attribute activation maps.

Performance Metrics: To evaluate performance of method of present disclosure, two performance metrics are used: (1) Top-k retrieval accuracy (or top-k accuracy) wherein labels corresponding to the top-k images recommended by method of present disclosure are identified and counted as a hit, if one image with same attributes as in personalization instructions is found; or else a miss. (2) Normalized discounted cumulative gain (NDCG@k) computed according to equation 6 wherein iDCG is the discounted cumulative gain (DCG) in the ideal order and rel(i) is the matched attribute from the M retrieved image and the number of attributes in personalization instructions divided by total number of attributes of the product.

$$NDCG@k = \frac{1}{iDCG}\sum_{i=1}^{k} \frac{2^{rel(i)}-1}{\log(i+1)} \quad (6)$$

Quantitative Results

A) Substitute Product Recommendation with Only Query Image as Input

Substitute product recommendation with only query image as input involves recommending visually similar products carrying same attributes as in the query image. For the evaluation, 4000 query images are considered from each database and the top-k accuracy and NDCG@k values are reported in Table 2 for k=10, 20, 30, 40, 50. From table 2 it is observed that Shopping100k database gives marginally better performance than DeepFashion database due to the presence of only product images.

TABLE 2

| | Shopping100K | | DeepFashion | |
|---|---|---|---|---|
| k | Top-k accuracy | NDCG@k | Top-k accuracy | NDCG@k |
| 10 | 0.694 | 0.874 | 0.681 | 0.936 |
| 20 | 0.735 | 0.857 | 0.713 | 0.930 |
| 30 | 0.752 | 0.856 | 0.731 | 0.929 |
| 40 | 0.765 | 0.856 | 0.744 | 0.929 |

Top-30 retrieval accuracy of method of present disclosure is compared with baselines and the result is reported in table 3 for both product recommendation with only query image and product recommendation with query image and personalization instructions. From table 3, it can be observed that the method 200 outperforms other existing methods by a significant margin, reinstating the importance of focused attention to obtain local discriminatory cues for better visual recognition. Furthermore, the top-k accuracy values obtained from all the baselines using different values of k for Shopping100k and DeepFashion database are illustrated in FIGS. 5A and 5B, respectively, to show that even for lower k values, method 200 provides a significantly better performance than the state-of-the-art results.

TABLE 3

| | Shopping100K | | DeepFashion | |
|---|---|---|---|---|
| | Only query image | Query image + Personalization instructions | Only query image | Query image + Personalization instructions |
| Attribute-based | 0.593 | 0.211 | 0.464 | 0.123 |
| AMNet | 0.637 | 0.405 | 0.483 | 0.246 |
| FSNet w/o Loc | 0.611 | 0.512 | 0.448 | 0.313 |
| FSNet | 0.651 | 0.566 | 0.469 | 0.376 |
| Method 200 | 0.752 | 0.742 | 0.731 | 0.662 |

B) Substitute Product Recommendation with a Query Image and One Personalization Instruction as Input In second set of experiments, substitute product recommendation is implemented with the query image and one personalization instruction which can include any of the six attributes present in the database. The top-k and NDCG@k where k=10, 20, 30, 40 on DeepFashion database for search by query and personalization instruction are reported in table 4. The first noticeable difference between the performance in the previous search st rategy with this is the reduction in performance which substantiates the difficulty of the problem. Similarly, table 5 comprises the top-k and NDCG@k where k=10, 20, 30, 40 on Shopping100k database for search by query and one personalization instruction. Table 6 compares the top-30 retrieval accuracy of baselines with the proposed method 200 on specific categories of Shopping100K and DeepFashion database.

TABLE 4

| | k = 10 | | k = 20 | | k = 30 | | k = 40 | |
|---|---|---|---|---|---|---|---|---|
| Attribute | Top-k accuracy | NDCG @k | Top-k accuracy | NDCG @k | Top-k accuracy | NDCG @k | Top-k accuracy | NDCG @k |
| Texture | 0.431 | 0.931 | 0.588 | 0.923 | 0.636 | 0.922 | 0.652 | 0.935 |
| Sleeve | 0.580 | 0.934 | 0.703 | 0.928 | 0.727 | 0.928 | 0.749 | 0.929 |
| Length | 0.363 | 0.932 | 0.515 | 0.924 | 0.554 | 0.923 | 0.577 | 0.924 |
| Neckline | 0.605 | 0.937 | 0.739 | 0.931 | 0.768 | 0.930 | 0.784 | 0.930 |
| Category | 0.485 | 0.928 | 0.631 | 0.921 | 0.667 | 0.920 | 0.698 | 0.921 |
| Shape | 0.443 | 0.924 | 0.613 | 0.917 | 0.652 | 0.916 | 0.676 | 0.918 |

TABLE 5

| | k = 10 | | k = 20 | | k = 30 | | k = 40 | |
|---|---|---|---|---|---|---|---|---|
| Attribute | Top-k accuracy | NDCG @k | Top-k accuracy | NDCG @k | Top-k accuracy | NDCG @k | Top-k accuracy | NDCG @k |
| Colour | 0.511 | 0.861 | 0.655 | 0.849 | 0.738 | 0.846 | 0.775 | 0.847 |
| Collar | 0.429 | 0.881 | 0.626 | 0.857 | 0.638 | 0.854 | 0.669 | 0.855 |
| Fastening | 0.208 | 0.887 | 0.358 | 0.866 | 0.503 | 0.861 | 0.504 | 0.860 |
| Neckline | 0.368 | 0.884 | 0.531 | 0.867 | 0.641 | 0.868 | 0.675 | 0.868 |
| Pattern | 0.398 | 0.863 | 0.563 | 0.842 | 0.674 | 0.838 | 0.678 | 0.840 |
| Sleeve | 0.589 | 0.915 | 0.693 | 0.905 | 0.761 | 0.905 | 0.775 | 0.904 |

TABLE 6

| Method | Shopping100K | | | | | | DeepFashion | | |
|---|---|---|---|---|---|---|---|---|---|
| | Colour | Collar | Fastening | Neckline | Pattern | Sleeve | Category | Shape | Texture |
| Attribute-based | 0.175 | 0.195 | 0.181 | 0.137 | 0.299 | 0.101 | 0.118 | 0.138 | 0.115 |
| AMNet | 0.433 | 0.477 | 0.248 | 0.350 | 0.388 | 0.360 | 0.218 | 0.249 | 0.273 |
| FSNet w/o Loc | 0.583 | 0.599 | 0.336 | 0.494 | 0.552 | 0.524 | 0.202 | 0.409 | 0.330 |
| FSNet | 0.649 | 0.642 | 0.423 | 0.532 | 0.575 | 0.640 | 0.380 | 0.409 | 0.338 |
| Method 200 | 0.738 | 0.626 | 0.503 | 0.641 | 0.674 | 0.761 | 0.667 | 0.652 | 0.636 |

From table 6, it is observed that the proposed attention-guided multi-scale feature extraction strategy benefits the recognition performance by outperforming attributes for all cases, except for collar attribute in Shopping100k (0.626 compared to 0.642 given by FashionSearchNet). The consistency in improved performance further necessitates the ASE modules and the sub-networks for discriminatory style-space representation. Furthermore, the top-k accuracy values obtained from all the baselines using different values of k for substitute product recommendation with personalization instructions for Shopping100k and DeepFashion database are illustrated in FIGS. 5C and 5D, respectively.

C) Substitute Product Recommendation with a Query Image and More than One Personalization Instructions as Input The challenges involved in recommending substitute fashion products increase when the number of attributes specified in personalization instruction increases from one attribute to multiple attributes. To facilitate multiple search suggestion by users, the system should be able to handle multiple attributes at once. However, most of the existing methods consider only one attribute from the user. One of the state-of-the-art methods (Bo Zhao et al. Memory-augmented attribute manipulation networks for interactive fashion search. In Proceedings of the IEEE Conference on Computer Vision and Pattern Recognition (CVPR), pages 1520-1528, 2017) performed recommendation using two attributes, but the robustness of the network with the variation in the number of desired attributes has not been investigated. To address this, experiments are performed to observe the performance of the method 200 to encounter this problem. Here, up to four attributes are provided in the personalization instruction and the performance for both the databases are reported in table 7. From the results in table 7, it can be observed that the method 200 is well-suited for incorporating multiple attributes in personalization instructions during product recommendation without significantly degrading the performance. Similarly, it can be concluded that the generic vectors for each fine-grained attribute are discriminatory in the multi-attribute update scenario.

TABLE 7

| Number of attributes in personalization instruction | Shopping100k | | DeepFashion | |
|---|---|---|---|---|
| | Top-30 accuracy | NDCG@30 | Top-30 accuracy | NDCG@30 |
| 1 | 0.677 | 0.878 | 0.662 | 0.928 |
| 2 | 0.648 | 0.867 | 0.573 | 0.921 |
| 3 | 0.484 | 0.875 | 0.647 | 0.922 |
| 4 | 0.511 | 0.848 | 0.645 | 0.925 |

D) Ablation Study Experiments

Several ablation experiments are conducted to understand the impact of the sub-networks in PAtSNet for discriminatory fashion attribute embedding. The experiment details and the performances are in table 8.

TABLE 8

| Ablation Experiments | DeepFashion | |
|---|---|---|
| | Query image | Query image + personalization instruction |
| Only Multi-scale feature extraction unit | 0.768 | 0.525 |
| Multi-scale feature extraction unit + Channel attention | 0.838 | 0.789 |
| Multi-scale feature extraction unit + Spatial attention | 0.849 | 0.776 |
| One ASE Module | 0.624 | 0.457 |
| PAtSNet | 0.894 | 0.846 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved technical challenges in the field of personalized substitute product recommendation, particularly, presence of overlapping fine-grained attributes, variations in attribute style and visual appearance, small inter-class variation and class imbalance in the images of products. The embodiment thus provides a method of personalized substitute product recommendation using PAtSNet comprising neural network layers interleaved with ASE modules to generate attribute-aware feature representation vector by extracting fine-grained features of each attribute in a query image. This feature representation vector helps in recommending products that suit user requirements. Although, the embodiments of present disclosure are explained using clothing products, the disclosed method works for any other products and can be utilized in e-commerce applications to recommend suitable products to the user according to their requirements.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for personalized substitute product recommendation, the method comprising:
   receiving, by one or more hardware processors, a query image of a product and optionally one or more personalization instructions comprising one or more attributes of the product and values corresponding to the one or more attributes;
   generating, by the one or more hardware processors, a plurality of feature vectors of the query image using a plurality of Personalized Attribute Search Networks (PAtSNets), wherein each of the plurality of PAtSNets generate one feature vector corresponding to an attribute of the query image, wherein each of the plurality of PAtSNets comprises a plurality of neural network layers interleaved with a plurality of Attentive Style Embedding (ASE) modules, and wherein each of the plurality of ASE modules includes a multi-scale feature extraction sub-network, and a concurrent axial attention sub-network;
   concatenating, by the one or more hardware processors, the plurality of feature vectors into a feature representation vector, wherein the feature vectors corresponding to the one or more attributes in the one or more personalization instructions, if present, are replaced by generic vectors before concatenation; and
   recommending, by the one or more hardware processors, one or more images of the product from a database of images based on distance between the feature representation vector and vectors of each image in the database of images.

2. The method of claim 1, wherein the one or more personalization instructions specify user requirements with respect to the one or more attributes of the product in the query image.

3. The method of claim 1, wherein the generic vectors are feature vectors representing values corresponding to the one or more attributes in the one or more personalization instructions.

4. The method of claim 1, wherein the multi-scale feature extraction sub-network extracts fine-grained attribute features of an input image across multiple scales by:
   generating a tensor by concatenating responses of—(i) performing a plurality of convolution operations on the input image by considering different kernel sizes for each of the plurality of convolution operations, and (ii) performing a convolution operation followed by a pooling operation on the input image;
   passing the tensor through a plurality of convolution layers to obtain a plurality of feature maps in a plurality of spatial dimensions, wherein feature map generated at a convolution layer is down scaled by a factor of two before passing to next convolution layer; and
   performing transposed convolution operation on the plurality of feature maps to generate a multi-scale image feature vector.

5. The method of claim 1, wherein the concurrent axial attention sub-network generates feature representation of the input image by:
   accepting the multi-scale image feature vector as input;
   generating a height embedding, a width embedding and a plurality of channel embeddings of the input by processing the input across height, width, and plurality of channel dimensions respectively;

computing a height attention mask, a width attention mask, and a channel attention mask by applying a sigmoid activation function on the height embedding, width embedding, and a dense operation followed by the sigmoid activation on the plurality of channel embeddings; and multiplying the multi-scale image feature vector with each of the height attention mask, the width attention mask, and the channel attention mask, and summing up the resultant products to obtain axial attentive image feature.

6. A system comprising:

a memory storing instructions;

one or more communication interfaces; and one or more hardware processors coupled to the memory via the one or more communication interfaces, wherein the one or more hardware processors are configured by the instructions to:

receive a query image of a product and optionally one or more personalization instructions comprising one or more attributes of the product and values corresponding to the one or more attributes;

generate a plurality of feature vectors of the query image using a plurality of Personalized Attribute Search Networks (PAtSNets), wherein each of the plurality of PAtSNets generate one feature vector corresponding to an attribute of the query image, wherein each of the plurality of PAtSNets comprises a plurality of neural network layers interleaved with a plurality of Attentive Style Embedding (ASE) modules, and wherein each of the plurality of ASE modules includes a multi-scale feature extraction sub-network, and a concurrent axial attention sub-network;

concatenate the plurality of feature vectors into a feature representation vector, wherein the feature vectors corresponding to the one or more attributes in the one or more personalization instructions, if present, are replaced by generic vectors corresponding to the one or more attributes in the one or more personalization instructions before concatenation; and recommend one or more images of the product from a database of images based on distance between the feature representation vector and vectors of each image in the database of images.

7. The system of claim 6, wherein the one or more personalization instructions specify user requirements with respect to the one or more attributes of the product in the query image.

8. The system of claim 6, wherein the generic vectors corresponding to the one or more attributes in the one or more personalization instructions are feature vectors representing values corresponding to the one or more attributes in the one or more personalization instructions.

9. The system of claim 6, wherein the multi-scale feature extraction sub-network extracts fine-grained attribute features of an input image across multiple scales by:

generating a tensor by concatenating responses of—(i) performing a plurality of convolution operations on the input image by considering different kernel sizes for each of the plurality of convolution operations, and (ii) performing a convolution operation followed by a pooling operation on the input image;

passing the tensor through a plurality of convolution layers to obtain a plurality of feature maps in a plurality of spatial dimensions, wherein feature map generated at a convolution layer is down scaled by a factor of two before passing to next convolution layer; and performing transposed convolution operation on the plurality of feature maps to generate a multi-scale image feature vector.

10. The system of claim 6, wherein the concurrent axial attention sub-network generates feature representation of the input image by:

accepting the multi-scale image feature vector as input;

generating a height embedding, a width embedding and a plurality of channel embeddings of the input by processing the input across height, width, and plurality of channel dimensions respectively;

computing a height attention mask, a width attention mask, and a channel attention mask by applying a sigmoid activation function on the height embedding, width embedding, and a dense operation followed by the sigmoid activation on the plurality of channel embeddings; and multiplying the multi-scale image feature vector with each of the height attention mask, the width attention mask, and the channel attention mask, and summing up the resultant products to obtain axial attentive image feature.

11. One or more non-transitory machine-readable information storage mediums comprising one or more instructions which when executed by one or more hardware processors cause:

receiving a query image of a product and optionally one or more personalization instructions comprising one or more attributes of the product and values corresponding to the one or more attributes;

generating a plurality of feature vectors of the query image using a plurality of Personalized Attribute Search Networks (PAtSNets), wherein each of the plurality of PAtSNets generate one feature vector corresponding to an attribute of the query image, wherein each of the plurality of PAtSNets comprises a plurality of neural network layers interleaved with a plurality of Attentive Style Embedding (ASE) modules, and wherein each of the plurality of ASE modules includes a multi-scale feature extraction sub-network, and a concurrent axial attention sub-network;

concatenating the plurality of feature vectors into a feature representation vector, wherein the feature vectors corresponding to the one or more attributes in the one or more personalization instructions, if present, are replaced by generic vectors before concatenation; and recommending one or more images of the product from a database of images based on distance between the feature representation vector and vectors of each image in the database of images.

12. The one or more non-transitory machine-readable information storage mediums of claim 11, wherein the one or more personalization instructions specify user requirements with respect to the one or more attributes of the product in the query image, and wherein the generic vectors are feature vectors representing values corresponding to the one or more attributes in the one or more personalization instructions.

13. The one or more non-transitory machine-readable information storage mediums of claim 11, wherein the multi-scale feature extraction sub-network extracts fine-grained attribute features of an input image across multiple scales by:

generating a tensor by concatenating responses of—(i) performing a plurality of convolution operations on the input image by considering different kernel sizes for each of the plurality of convolution operations, and (ii) performing a convolution operation followed by a pooling operation on the input image;

passing the tensor through a plurality of convolution layers to obtain a plurality of feature maps in a plurality of spatial dimensions, wherein feature map generated at a convolution layer is down scaled by a factor of two before passing to next convolution layer; and performing transposed convolution operation on the plurality of feature maps to generate a multi-scale image feature vector.

14. The one or more non-transitory machine-readable information storage mediums of claim 11, wherein the concurrent axial attention sub-network generates feature representation of the input image by:

accepting the multi-scale image feature vector as input;

generating a height embedding, a width embedding and a plurality of channel embeddings of the input by processing the input across height, width, and plurality of channel dimensions respectively;

computing a height attention mask, a width attention mask, and a channel attention mask by applying a sigmoid activation function on the height embedding, width embedding, and a dense operation followed by the sigmoid activation on the plurality of channel embeddings; and multiplying the multi-scale image feature vector with each of the height attention mask, the width attention mask, and the channel attention mask, and summing up the resultant products to obtain axial attentive image feature.

* * * * *